US008351766B2

(12) United States Patent  
Subbian et al.

(10) Patent No.: US 8,351,766 B2  
(45) Date of Patent: Jan. 8, 2013

(54) MULTI DVR VIDEO PACKAGING FOR INCIDENT FORENSICS

(75) Inventors: Deepakumar Subbian, Karnataka (IN); Mayur S. Salgar, Karnataka (IN); Ratheesh K, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 485 days.

(21) Appl. No.: 12/433,154

(22) Filed: Apr. 30, 2009

(65) Prior Publication Data

US 2010/0278506 A1 Nov. 4, 2010

(51) Int. Cl.
H04N 5/917 (2006.01)

(52) U.S. Cl. .................................. 386/331; 386/326
(58) Field of Classification Search .................. 348/143; 386/326, 331
See application file for complete search history.

(56) References Cited

U.S. PATENT DOCUMENTS

| | | | |
|---|---|---|---|
| 6,054,943 A * | 4/2000 | Lawrence | 341/87 |
| 2004/0153647 A1 | 8/2004 | Rotholtz et al. | |
| 2005/0091311 A1 | 4/2005 | Lund et al. | |
| 2005/0169367 A1 * | 8/2005 | Venetianer et al. | 375/240.01 |
| 2005/0286863 A1 * | 12/2005 | Howarth | 386/52 |
| 2006/0034586 A1 | 2/2006 | Millar et al. | |
| 2007/0107029 A1 | 5/2007 | Monroe et al. | |
| 2008/0073936 A1 | 3/2008 | Jeng | |
| 2010/0157050 A1 * | 6/2010 | Drive et al. | 348/143 |

OTHER PUBLICATIONS

European Search Report and Annex, dated May 29, 2012, corresponding to Application No. EP 10 16 0789.

* cited by examiner

*Primary Examiner* — Jamie Atala  
(74) *Attorney, Agent, or Firm* — Husch Blackwell LLP

(57) ABSTRACT

A system and method of exporting and playing video from different video recorders at the same time and in a single viewing window while maintaining the integrity of the video is provided. The method includes selecting a plurality of data collection devices, selecting a plurality of video data streams capture or recorded by the selected data collection devices, exporting the selected video data streams, packaging the exported video data streams, and playing the packaged video data streams substantially simultaneously. Each of the selected video data streams has a respective original format with some formats different from others, and each of the packaged video data streams is played in its original format.

15 Claims, 8 Drawing Sheets

PRESERVING NATIVE DVR CLIP FORMAT INTO ONE M&M CLIP

MULTI DVR VIDEO PACKAGING FOR INCIDENT FORENSICS

FIELD OF INVENTION

The present invention relates generally to video exporting and packaging. More particularly, the present invention relates to systems and methods of exporting, packaging, and playing video from different video recorders at the same time and in a single viewing window while maintaining the integrity of the video.

BACKGROUND

In video platforms known by those of skill in the art, video from multiple data collection devices can be integrated so the video is viewed in the same video viewer. However, when video is exported from different devices, there is no standard mechanism for protecting the integrity of the video and allowing playback of uncompromised video.

For example, multiple cameras can be located at different positions in a particular location and can capture an incident that occurs in the location. Each of the cameras can be connected to a different digital video recorder (DVR) or network video recorder (NVR). Traditionally, exporting video of the incident would involve creating individual data streams from each DVR and then manually creating a DVD of the incident that includes the video data streams from each DVR. To review the captured incident, each data stream would be played one by one rather than at the same time. Playing the video data streams one by one prevents any reference to the relationships between each camera.

Systems and methods have been developed to export individual data streams and merge them together as a single data stream using a video authoring tool. However, in these systems and methods, the data streams cannot have different formats. Rather, the video data streams must be configured and modified so they are all in the same format in terms of resolution, frames per second, compression, duration and the like. When this occurs, the integrity of the video is compromised.

Accordingly, there is a continuing, ongoing need for a system and method of exporting and playing video from different video recorders at the same time and in a single viewing window while maintaining the integrity of the video. Preferably, such systems and methods can play video in different formats without reformatting or reconfiguring the video.

DESCRIPTION OF THE PREFERRED EMBODIMENTS

Figure 1:
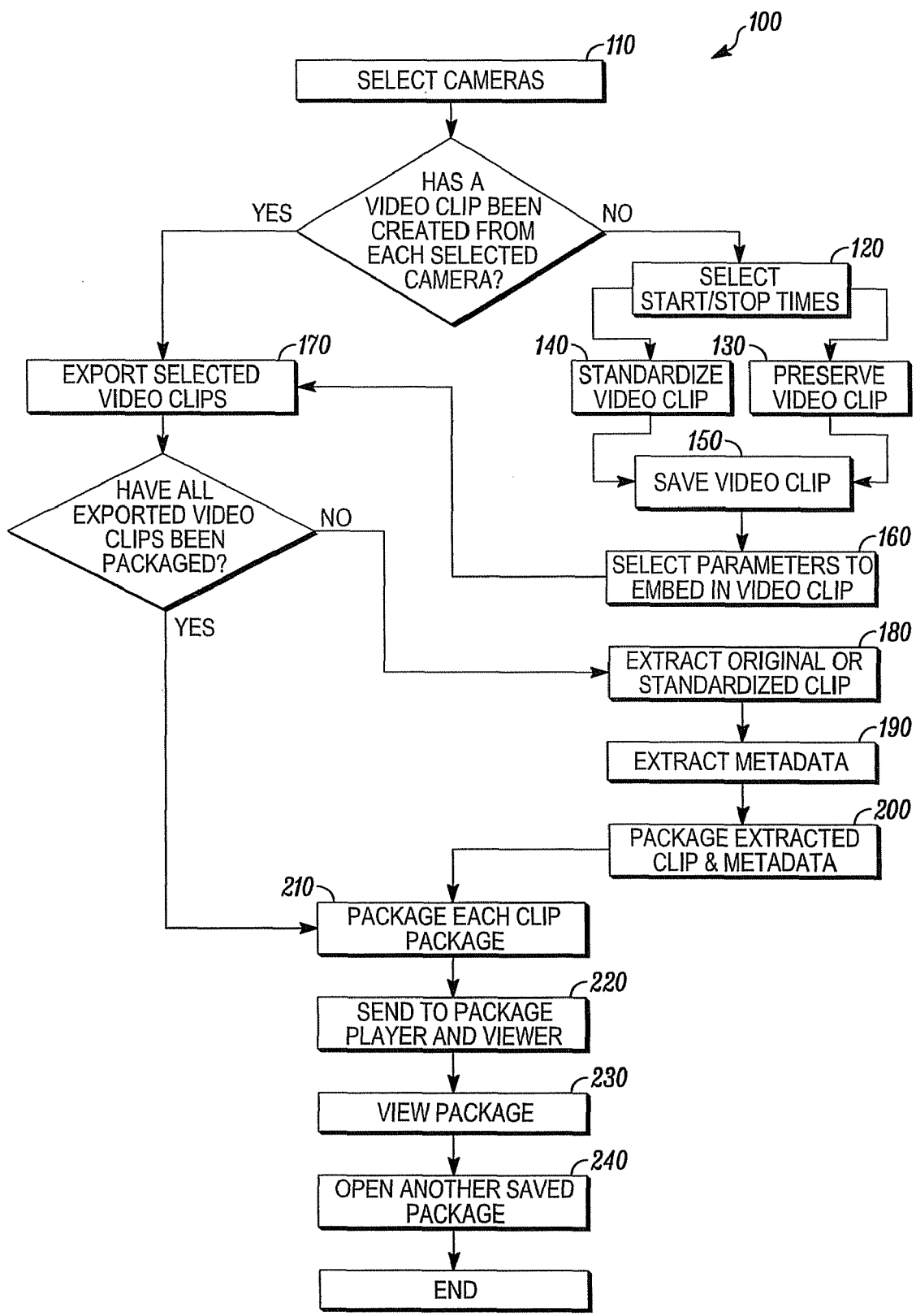
FIG. 1 is a flow diagram of a method of exporting and packaging video from multiple video recorders in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include a system and method of exporting and playing video from different video recorders at the same time and in a single viewing window while maintaining the integrity of the video. Preferably, such systems and methods can play video in different formats without reformatting or reconfiguring the video.

In accordance with the systems and methods of the present invention, multiple cameras can be located at different positions in a particular location and can capture incidents and events that occur in the location. Each of the cameras can be connected to a different DVR or NVR. When an incident or event occurs in the location, multiple cameras can capture the incident on video and send that video to associated recorders. Systems and methods of the present invention can export video data streams of the incident from the DVRs associated with the cameras that captured that incident.

After the video data streams are exported, systems and methods of the present invention can package the exported video data streams. In accordance with the present invention, the video data streams can be packaged with their associated metadata. The metadata associated with a particular video data stream can include information relating to the camera that captured the video, and the start and end time of the video, for example.

Packaging the video with its metadata facilitates objects and advantages of the present invention. For example, the packaged video data streams can be played at the same time in a single viewing screen, and the integrity of each video data stream can be maintained. That is, the various video data streams can have different resolutions, speed in terms of frames per second, compression, duration, and the like. The video data streams do not need to be reformatted or reconfigured. Additionally, packaging the video with its metadata allows the system recognize the original data collection device (camera and/or recorder) associated with the video.

To ensure that the integrity of each video data stream is maintained and no tampering occurs, the package of video data streams can be digitally signed. Alternatively, each individual video package can be digitally signed. Digital signatures, such as watermarks, are known by those of skill in the art and will not be explained further herein.

FIG. 1 illustrates a flow diagram of an exemplary method 100 of exporting and packaging video from multiple video recorders in accordance with the present invention. In the method, 100, a user can select the cameras or other data collections devices that he suspects captured the event or incident of interest as in 110.

For each selected camera, the user can select start and end times as in 120 so that a selected video data stream will be of the selected time frame and the selected video data streams can describe or show the event or incident of interest. For each selected video data stream, the user can choose to preserve the video data stream as in 130 so that it remains digitally unaltered or the user can choose to standardize the video data stream as in 140. In 150, the user can save the selected video data stream by choosing a file name, type, and location at which to save the video data stream. The user can also select particular parameters or features to be embedded in the video data stream as in 160.

After all of the desired video data streams are selected, the user can export the selected video data streams as in 170. It is to be understood that the selected and exported video data streams can be in any number of formats. In accordance with the present invention, the selected and exported video data streams do not have to be in the same format, but rather can have different resolution, speed in terms of frames per second, compression, duration, and the like all without limitation.

After the selected video data streams are exported as in 170, systems and method of the present invention can package the exported video data streams. For each exported video data stream, the original or standardized data stream (depending on what was selected in 130 and 140) can be extracted as in 180, and the metadata associated with the video data stream can be extracted as in 190. In 200, the extracted original or standardized data stream and associated metadata can be packaged together into a data stream package, and in 210 each of the data stream packages can be packaged together into a final package.

The final package can be sent to a package player and viewer in 220, and the video data streams from each data stream package in the final package can be played and viewed at the same time as in 230. If a user wishes to view video data streams from a different package, he can open another saved final package as in 240 to view the video from each data stream package of the newly selected final package.

Figure 2:
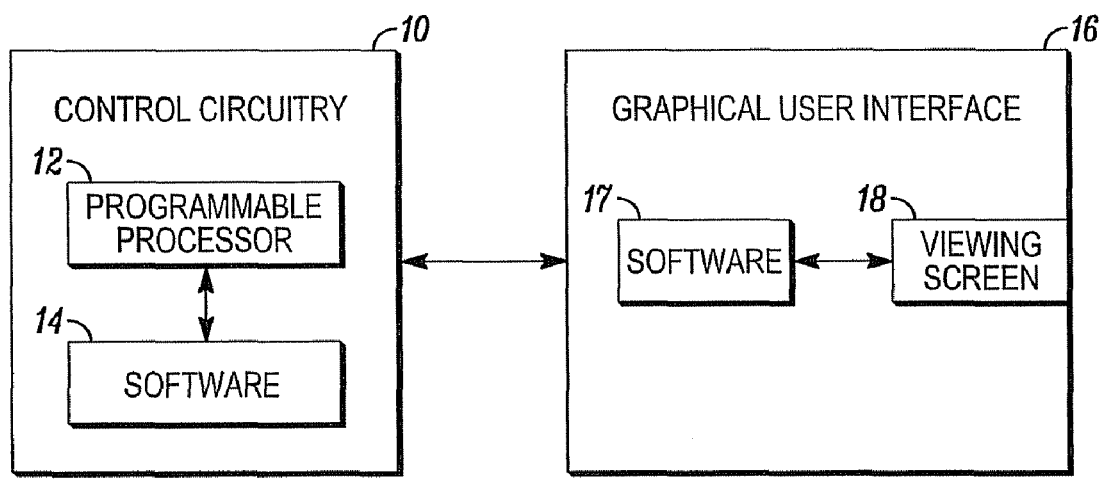
FIG. 2 is a block diagram of a system for carrying out the method of FIG. 1 in accordance with the present invention.

The method shown in FIG. 1 and others in accordance with the present invention can be implemented with a programmable processor and associated control circuitry. As seen in FIG. 2, control circuitry 10 can include a programmable processor 12 and associated software 14, stored on a local computer readable medium, as would be understood by those of ordinary skill in the art. Video from a plurality of cameras, recorders, or other data collection or storage devices can be input into the programmable processor and associated control circuitry. An associated user interface 16 can be in communication with the processor and associated circuitry 10. A viewing screen 18 of the user interface, as would be known by those of skill in the art, can display interactive and viewing windows. In embodiments of the present invention, the user interface 16 can be a multi-dimensional graphical user interface.

The interactive and viewing windows shown and described herein are exemplary only. Those of skill in the art will understand that the features of the windows shown and described herein may be displayed by additional or alternate windows. Alternatively, the features of the windows shown and described herein can be displayed on a console interface without graphics.

Figure 3:
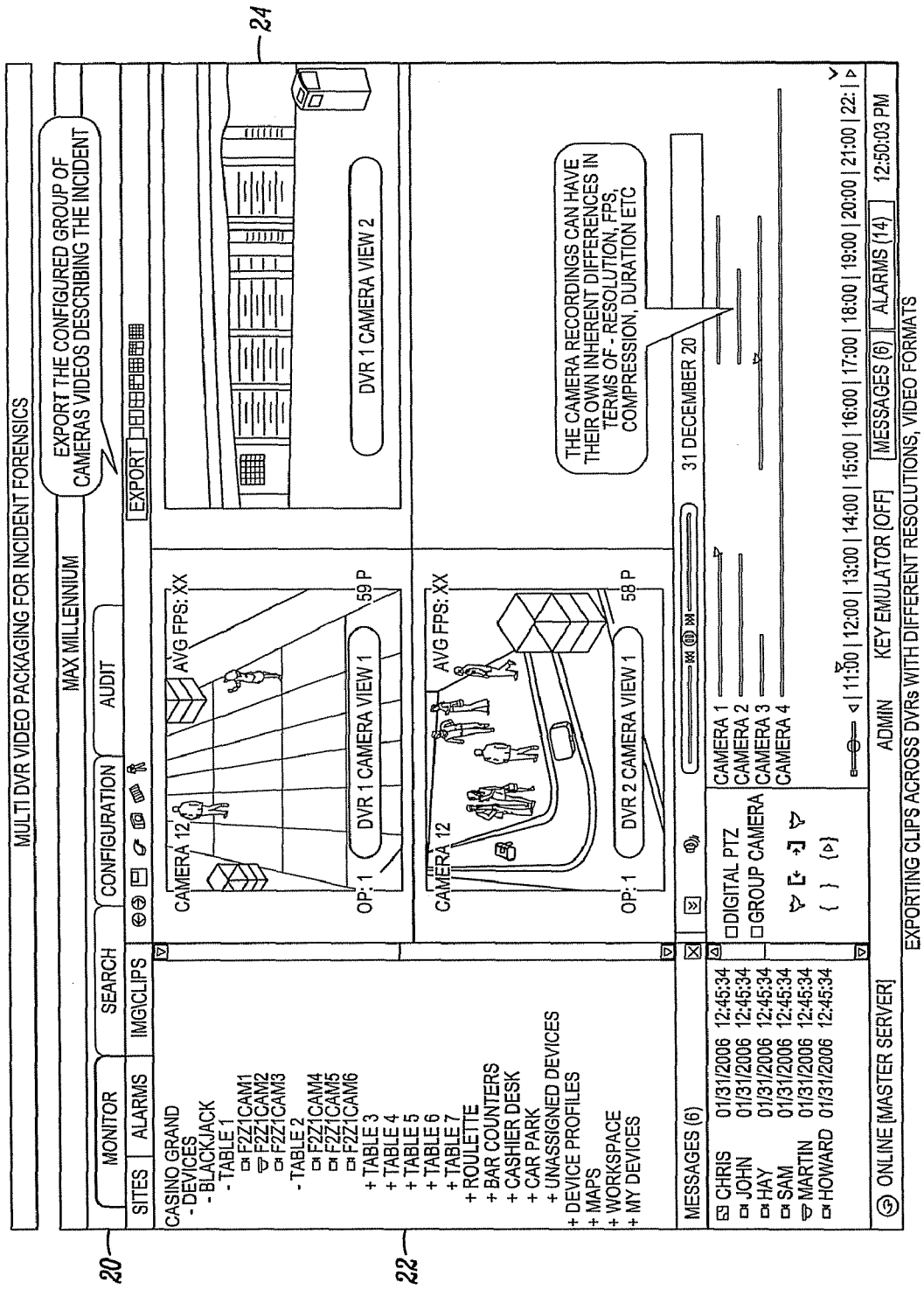
FIG. 3 is an interactive window displayed on a viewing screen of a graphical user interface of video from multiple video recorders.

Referring now to FIG. 3 an interactive window 20 displayed on a viewing screen of the graphical user interface in accordance with the present invention is shown. The names of various cameras, recorders, or other data collection or storage devices can be listed in a left pane 22 of the window 20. The camera names can be organized by their location, for example, for ease of reference. When a camera is selected, a video data stream from that camera can be displayed in a right pane 24 of the window 20. The video data streams from the different selected cameras can have different formats in terms of, for example, resolution, speed (frames per second), compression, duration, and like all without limitation.

Figure 4:
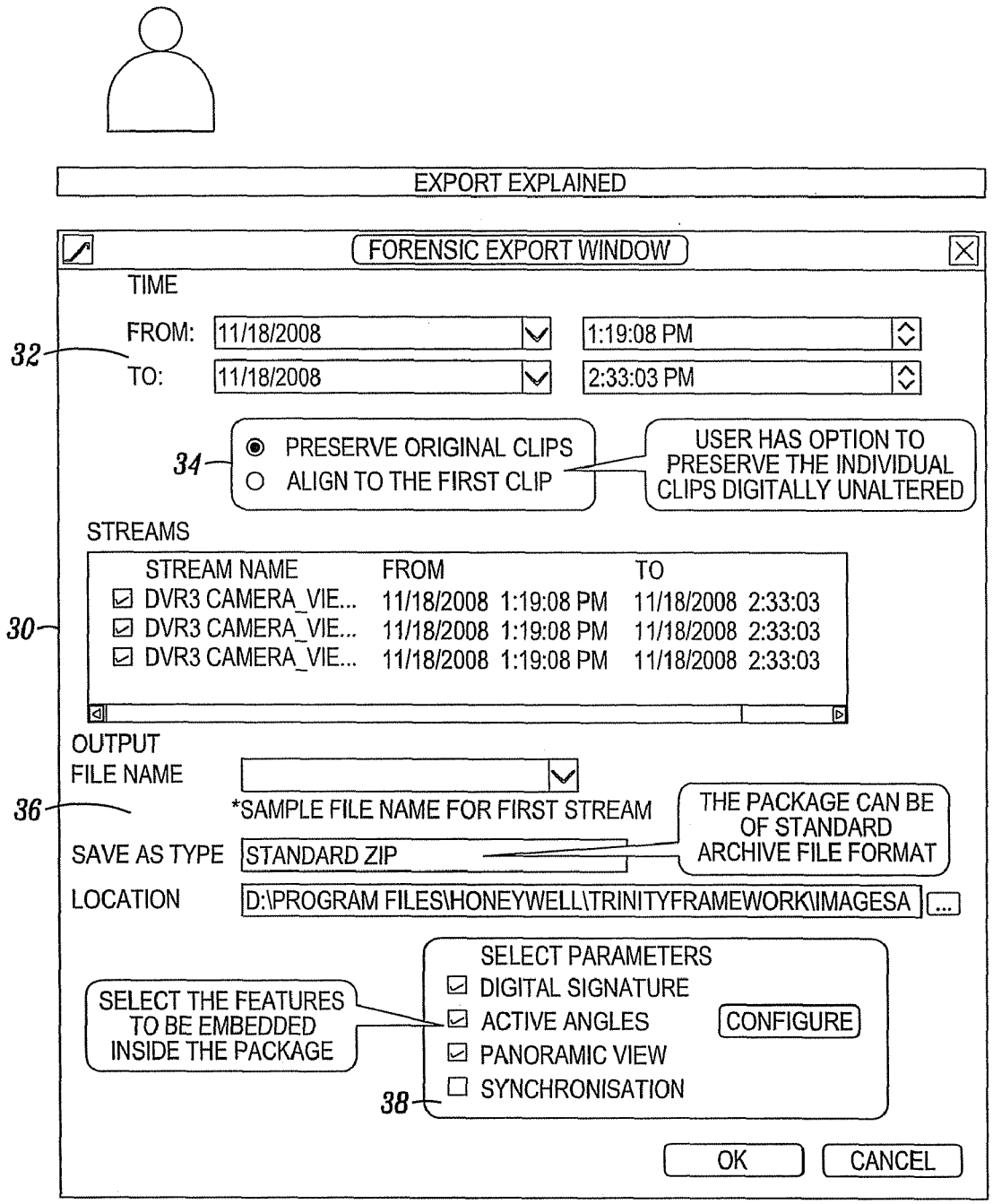
FIG. 4 is an interactive export window displayed on a viewing screen of a graphical user interface in accordance with the present invention.

FIG. 4 is an interactive export window 30 displayed on a viewing screen of the graphical user interface. For each selected video, a user can use a time portion 32 of the export window 30 to select start and stop times for a particular data stream. For each selected video data stream, the user can use a preservation portion 34 of the window 30 to select to preserve the original data stream so it remains digitally unaltered or to select to standardize the video data stream. The user can use a saving portion 36 of the window 30 to save the video data stream by specifying a file name for the data stream, the type of file the data stream will be saved as, and where the data stream will be saved. The user can also use a feature selection portion 38 of the window 30 to select parameters of features to embed in the video data stream, such as a digital signature, active angles, panoramic view, or synchronization, for example.

Figure 5:
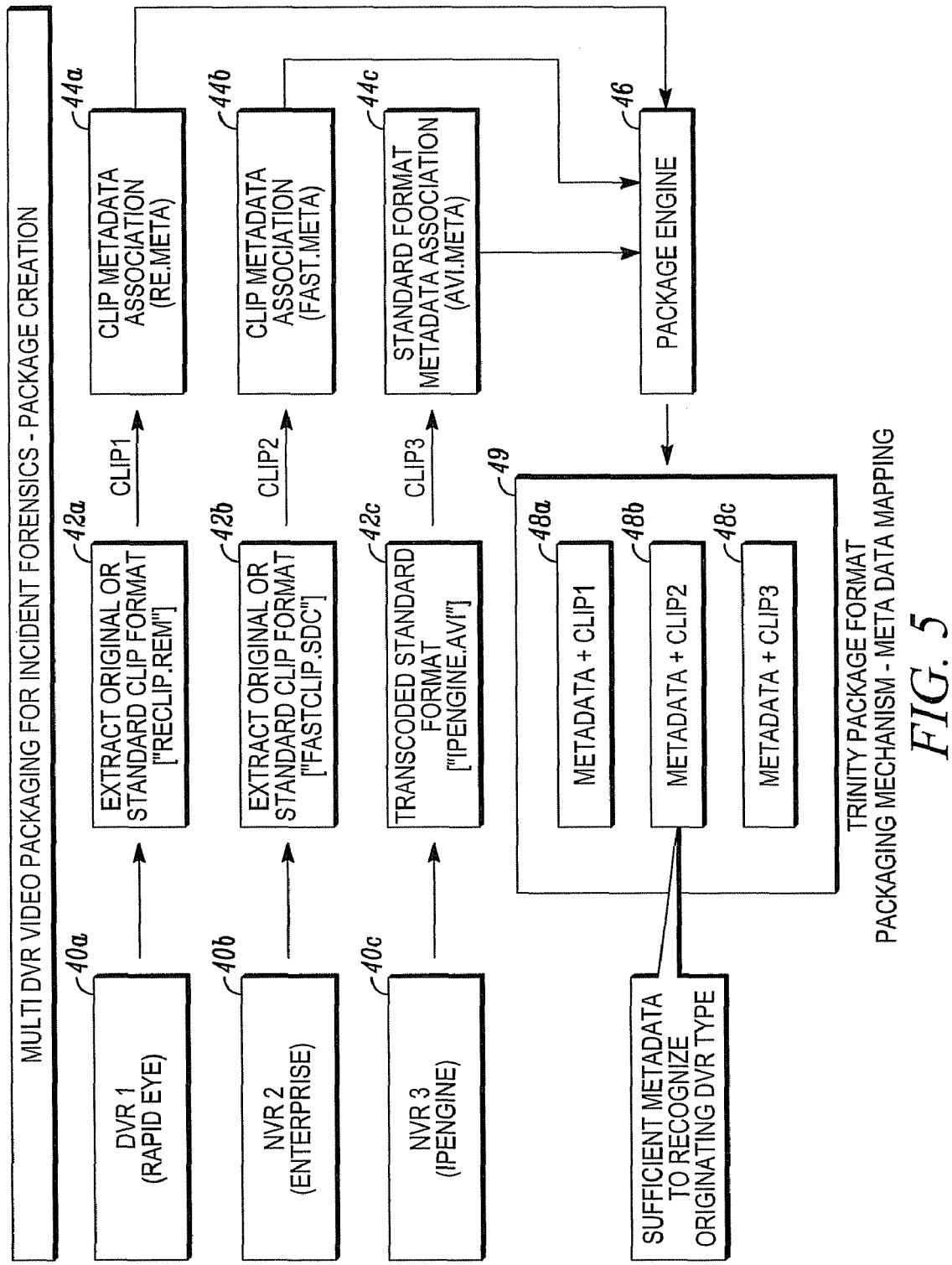
FIG. 5 is block diagram of a method of packaging video from multiple video recorders in accordance with the present invention.

After all of the video data streams have been selected and exported, the video data streams can be packaged. FIG. 5 is a block diagram of a method of packaging video. As seen in FIG. 5, video from multiple cameras and recorders, for example 40*a*, 40*b*, 40*c*, can be exported. The selected video data stream (either original or standardized) can be extracted from the exported video in 42*a*, 42*b*, and 42*c*. Associated metadata can then be extracted from each extracted data stream as in 44*a*, 44*b*, and 44*c*. In 46, the metadata extracted from each data stream can be packaged with that data stream to form data stream packages 48*a*, 48*b*, 48*c*, and data stream packages 48*a*, 48*b*, and 48*c* can be packaged into one final package 49.

Figure 6:
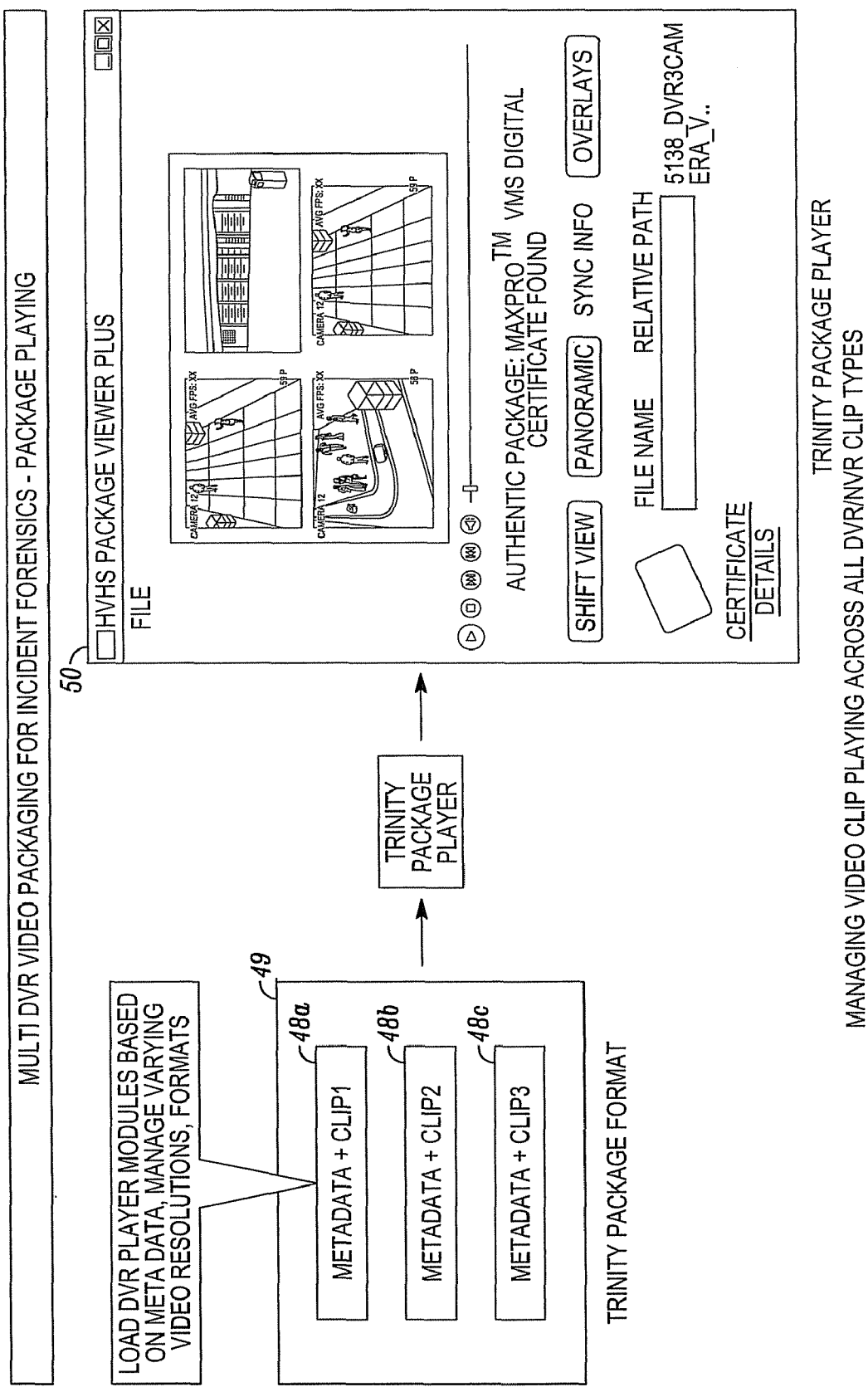
FIG. 6 is a block diagram of a method of playing video from multiple video recorders in accordance with the present invention.

FIG. 6 is a block diagram of a method of playing video in accordance with the present invention. The final package 49 containing the data stream packages, 48*a*, 48*b*, 48*c* can be sent to a viewer and player 50, and each data stream in the package 49 can be played in the player 50 at the same time. If a user wishes to view video from a different final package, the user can select another saved package and view the video data streams packaged therein.

Figure 7A:
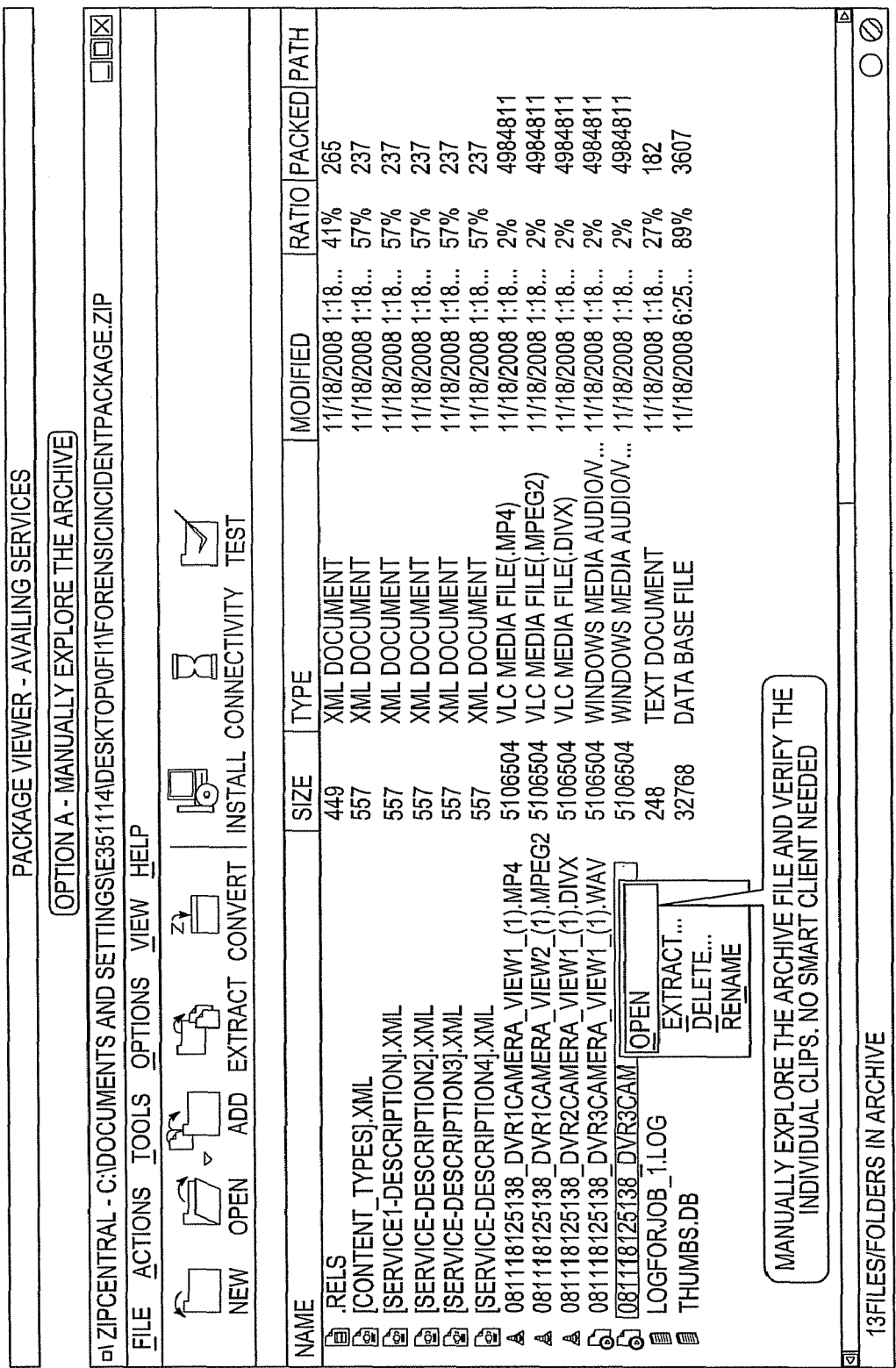
FIG. 7A is a file directory window of a video package created in accordance with the present invention.

FIG. 7A is a file directory window 52 of a video package created in accordance with the present invention. A user can view and navigate a directory window 52 to determine and verify what video data streams are packaged in a final package of video data streams. It is to be understood that the file format of the video data streams, video packages, and final packages of the present invention are standard file formats as known by those of skill in the art.

Figure 7B:
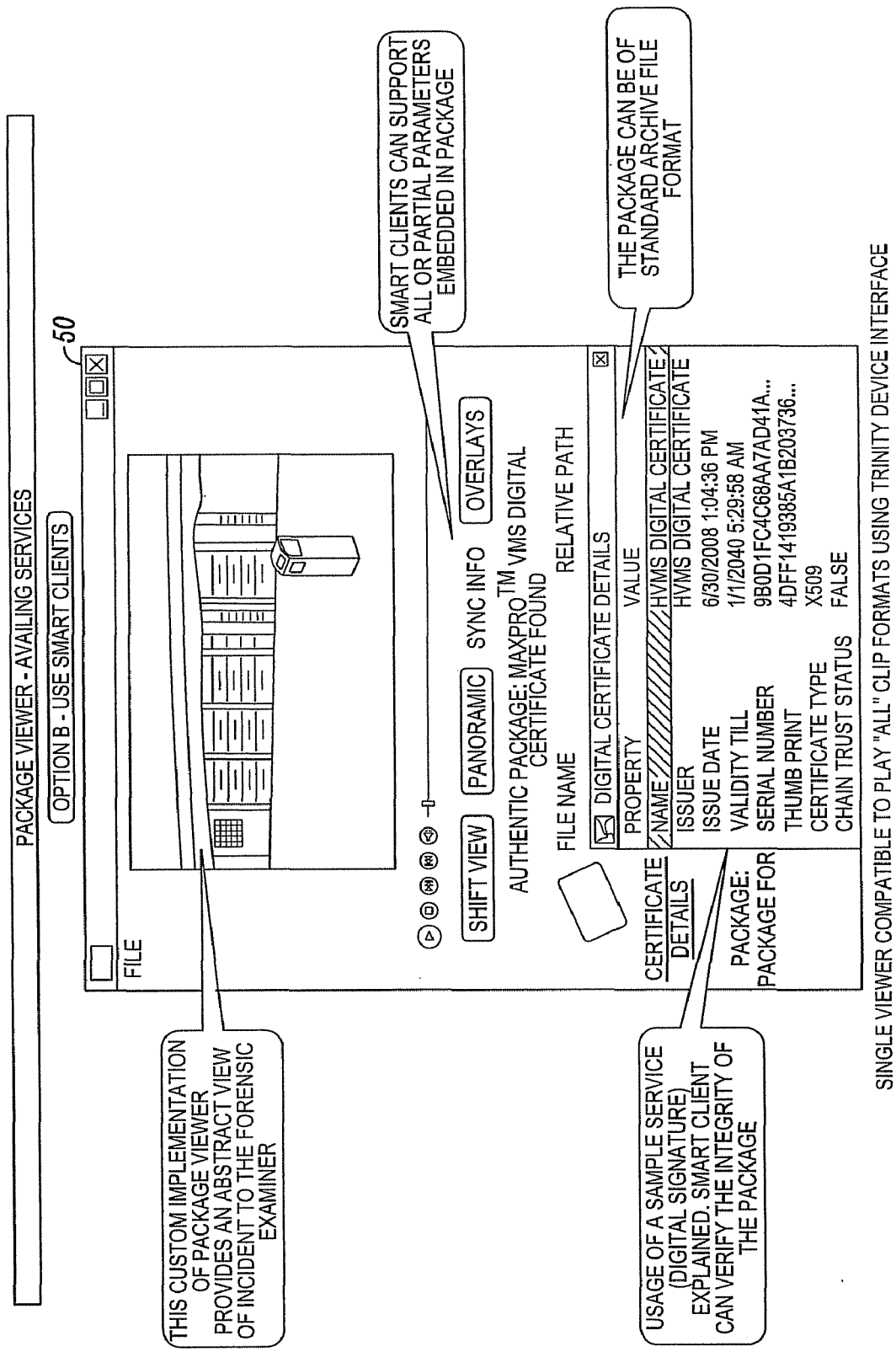
FIG. 7B is an interactive viewing window of a video player in accordance with the present invention.

FIG. 7B is an interactive viewing window of a video player 50 in accordance with the present invention. Because video from multiple cameras and/or recorders can be played at the same time in one video player window 50, a user can have an abstract view of an incident captured by the cameras and view the incident from multiple vantage points simultaneously. The video player of the present invention can support parameters or features embedded in the video packages and verify the integrity of the video.

From the foregoing, it will be observed that numerous variations and modifications may be effected without departing from the spirit and scope of the invention. It is to be understood that no limitation with respect to the specific system or method illustrated herein is intended or should be inferred. It is, of course, intended to cover by the appended claims all such modifications as fall within the sprit and scope of the claims.

What is claimed is:

1. A method comprising:
   selecting a plurality of data collection devices;
   selecting a plurality of video data streams captured or recorded by the selected data collection devices;
   preserving an original, digitally unaltered format of each of the selected video data streams;
   exporting the selected video data streams in each of the respective preserved original, digitally unaltered formats;
   packaging the exported video data streams in each of the respective preserved original, digitally unaltered formats; and
   playing the packaged video data streams in each of the respective preserved original, digitally unaltered formats substantially simultaneously,
   wherein packaging the exported video data streams includes
      extracting a data stream of each exported video data stream, the extracted data stream being in its original format;
      extracting metadata of each exported video data stream; and
      packaging the extracted data stream and extracted metadata into a data stream package for each exported video data stream in the plurality of video data streams, and
   wherein each piece of extracted metadata includes information relating to the data collection device that captured the video data stream associated with the metadata.

2. The method of claim 1 wherein selecting a plurality of video data streams further comprises selecting a start and stop time for each video data stream in the plurality of video data streams.

3. The method of claim 1 further comprising selecting at least one parameter to embed in each video data stream in the plurality of video data streams.

4. The method of claim 3 wherein the parameter comprises a digital signature.

5. The method of claim 1 wherein the plurality of data collection devices comprises at least one of a camera or a recorder.

6. An interactive viewing apparatus comprising:
   means for selecting a plurality of data collection devices;
   means for selecting a plurality of video data streams captured or recorded by the selected data collection devices;
   means for preserving an original, digitally unaltered format of each of the selected video data streams;
   means for exporting the selected video data streams in each of the respective preserved original, digitally unaltered formats;
   means for packaging the exported video data streams in each of the respective preserved original, digitally unaltered formats; and
   means for playing the packaged video data streams in each of the respective preserved, original, digitally unaltered formats substantially simultaneously,
   wherein the means for packaging the exported video data streams includes
      means for extracting a data stream of each exported video data stream, the extracted data stream being in its original format;
      means for extracting metadata of each exported video data stream; and
      means for packaging the extracted data stream and extracted metadata into a data stream package for each exported video data stream in the plurality of video data streams, and
   wherein each piece of extracted-metadata includes information relating to the data collection device that captured the video data stream associated with the metadata.

7. The interactive viewing apparatus of claim 6 wherein the means for selecting a plurality of video data streams further comprises means for selecting a start and stop time for each video data stream in the plurality of video data streams.

8. The interactive viewing apparatus of claim 6 further comprising means for selecting at least one parameter to embed in each video data stream in the plurality of video data streams.

9. The interactive viewing apparatus of claim 8 wherein the parameter comprises a digital signature.

10. The interactive viewing apparatus of claim 6 wherein the plurality of data collection devices comprises at least one of a camera or a recorder.

11. The interactive viewing apparatus of claim 6 which includes a graphical user interface associated with at least one of control circuitry or a programmable processor.

12. The interactive viewing apparatus of claim 11 wherein the control circuitry or the programmable processor exports the selected video data streams.

13. The interactive viewing apparatus of claim 11 wherein the control circuitry or the programmable processor packages the exported video data streams.

14. A system comprising:
   a programmable processor and associated control circuitry; and
   a user interface coupled to the programmable processor,
   wherein the user interface displays representations of a plurality of data collection devices,
   wherein the programmable processor and the associated control circuitry preserve an original, digitally unaltered format of video data streams selected from video data streams associated with a plurality of data collection devices,
   wherein the programmable processor and the associated control circuitry export and package the video data streams in each of the respective preserved original, digitally unaltered formats,
   wherein the programmable processor and the associated control circuitry extracts a data stream and metadata from each video data stream, the extracted data stream being in its original format, and
   wherein the extracted metadata includes information relating to the data collection device that captured the video data stream associated with the metadata.

15. The system of claim 14 wherein the programmable processor and the associated control circuitry verifies the integrity of each video data stream.

* * * * *